No. 782,390. PATENTED FEB. 14, 1905.
J. HANSEN.
WATER FLOOD GATE.
APPLICATION FILED JUNE 23, 1904.
2 SHEETS—SHEET 2.
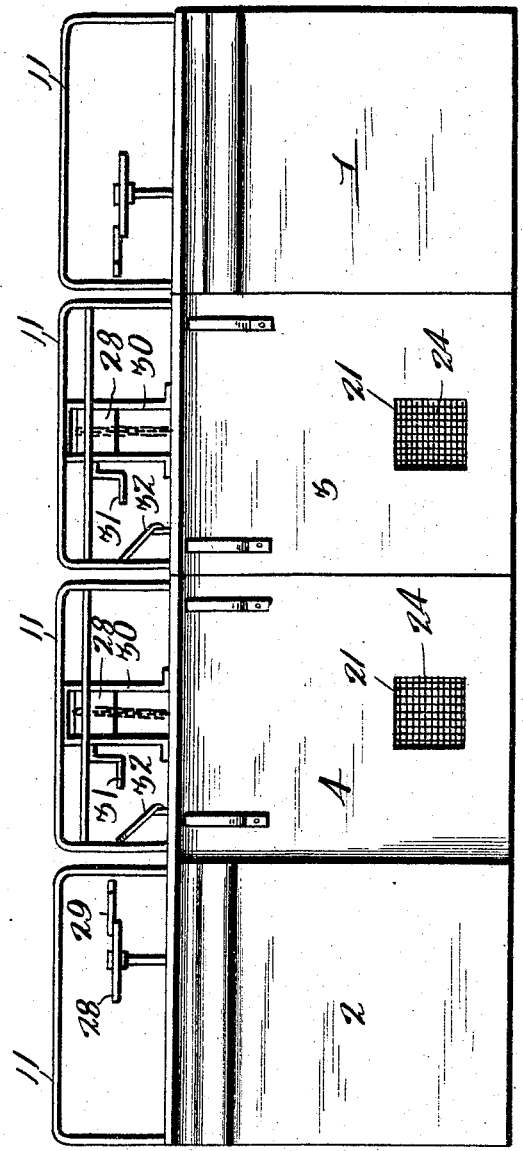
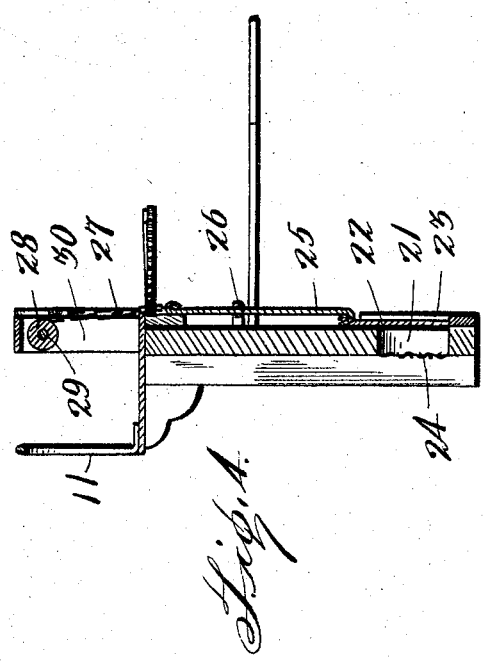
Witnesses
Inventor
J. Hansen,
By
Attorney No. 782,390. Patented February 14, 1905.

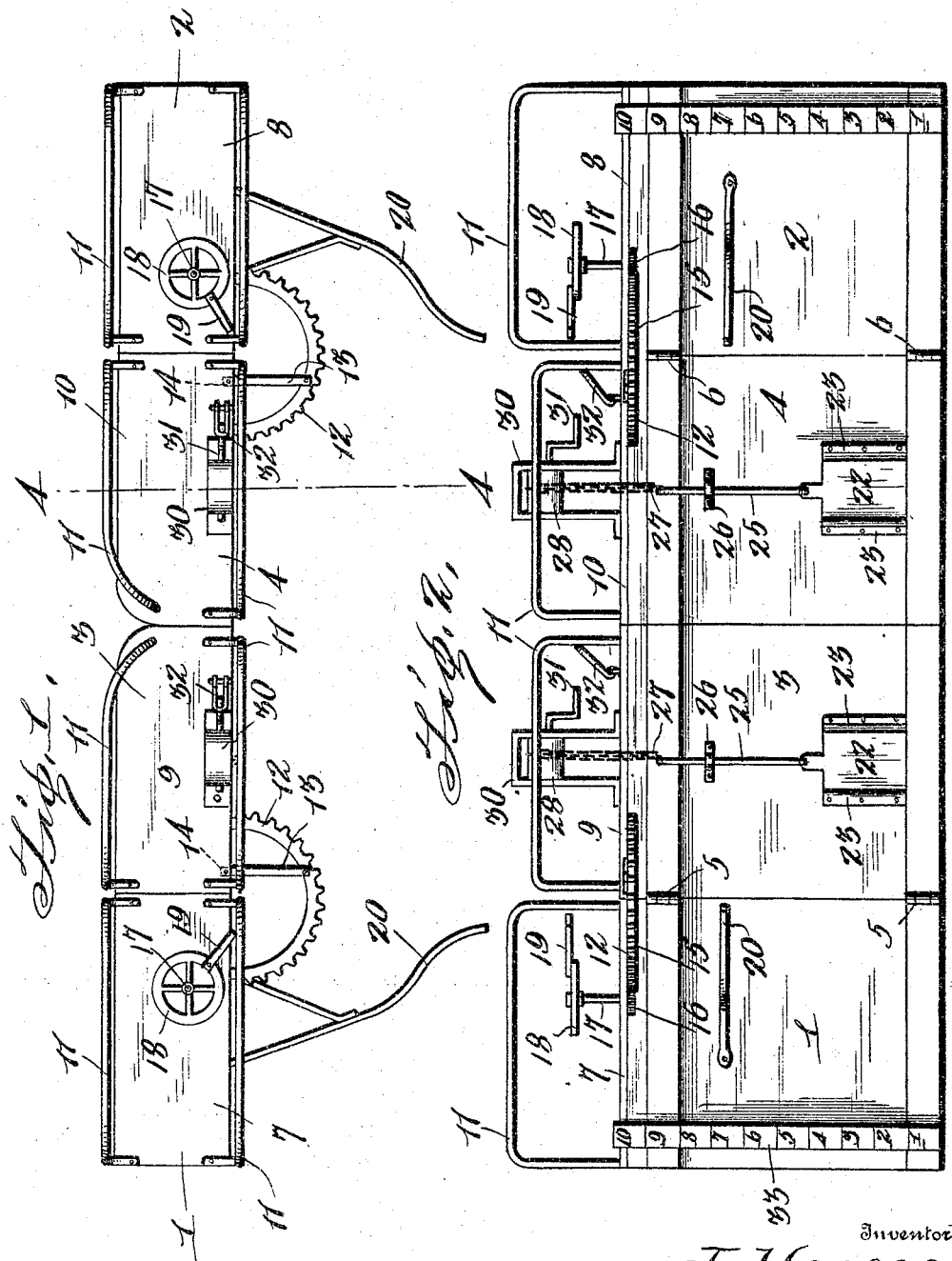

UNITED STATES PATENT OFFICE.

JACOB HANSEN, OF PATERSON, NEW JERSEY.

WATER FLOOD-GATE.

SPECIFICATION forming part of Letters Patent No. 782,390, dated February 14, 1905.

Application filed June 23, 1904. Serial No. 213,893.

*To all whom it may concern:*

Be it known that I, JACOB HANSEN, a citizen of the United States, residing at Paterson, in the county of Passaic and State of New Jersey, have invented certain new and useful Improvements in Water Flood-Gates; and I do declare the following to be a full, clear, and exact description of the invention, such as will enable others skilled in the art to which it appertains to make and use the same.

This invention relates to water doors or gates for use in dams, canals, and other waterways to control the flow of water; and its object is to provide a gate which may be quickly and conveniently regulated to permit of a determined flow under normal conditions and of an increased flow to prevent floods during high water or the passage of an abnormal volume of water along the waterway.

With these and other objects in view the invention consists of certain novel features of construction, combination, and arrangements of parts, as will be hereinafter more fully described, and particularly pointed out in the appended claims.

In the accompanying drawings, Figure 1 is a top plan view of a water or flood gate embodying my invention. Fig. 2 is an outer side elevation of the same. Fig. 3 is an inner side elevation, and Fig. 4 is a section on line 4 4 of Fig. 1.

Referring now more particularly to the drawings, 1 and 2 represent the side walls or abutments of the gateway, and 3 and 4 are main gates adapted to close the waterway between said walls or abutments, said gates being connected to the walls or abutments by the strap-hinges 5 and 6. The side walls or abutments 1 and 2 are provided with platforms 7 and 8, and the main gates 3 and 4 are provided with similar platforms 9 and 10, which aline with each other and the platforms of the abutments when the said gates are closed, as shown in Fig. 1. These platforms provide a passage-way to enable the gate-tender and others to pass from one side to the other of the watercourse at the gateway and to enable the tender to operate the gate-controlling mechanisms, as hereinafter described. Each platform may be provided with a safety rail or guard 11, which may be of any preferred construction.

Fixed at one end of each main gate is a segmental rack-bar 12, which is stayed and braced from the gate by a brace-rod 13, which rod is pivoted at its inner end, as shown at 14, to the gate to swing with the said bar 12. The opposite end of the bar moves in grooves or guideways 15 in the contiguous side wall or abutment or platform thereof and meshes with a pinion 16 on the lower end of an operating-rod 17, extending upwardly through the platform of said side wall or abutment and carrying at its upper end a crank-wheel 18 and an operating hand-lever 19, fixed to said shaft and wheel and designed to be employed to impart motion to the shaft to actuate the rack-bar 12, whereby said rack-bar will be caused to move in and out of the guideway 15 and to swing the gate to an open or closed position, as will be readily understood. The outward swinging movement of the gates is limited by stop bars or arms 20, of suitable construction, projecting upwardly from the walls or abutments 1 and 2.

Each main gate 3 and 4 is provided with a water-passage 21, closed by an auxiliary door or gate 22, which slides vertically in grooved guideways 23, secured to the gates. The said auxiliary door or gate 22 is disposed upon the outer side of the main gate, and the opposite or inner side of the passage 21 is covered by a grating or wicket 24, of mesh material, which will prevent twigs, leaves, branches, and other foreign matter carried along with the current of water from wedging in and choking the said passage. The auxiliary door or gate 22 is connected with the lower end of a rod 25, which slides in guides 26 on the main gate and is attached at its upper end to a chain, cable, or other like flexible connection 27, which is adapted to wind upon the drum 28 of a windlass mounted upon the platform of the main gate, said drum being fixed upon an actuating-shaft 29, journaled in the walls of a U-shaped frame or housing 30 and provided at one end with a crank-handle 31, whereby the drum may be operated to wind up or pay out the chain 27, and thus open or close the auxiliary door or gate 22. A bail 32 is pivoted to the platform of the main gate and may be moved into and out of engagement with the crank-handle 31 to hold the windlass shaft and drum from movement in its two positions. Gage boards or panels 33 may be arranged upon the opposite side of the gateway to indicate the depth or level of the water below the dam. These boards are graduated and marked to indicate the depth in feet and desired fractions thereof, as shown in Fig. 2.

In operation it will be understood that the main gates 3 and 4 are normally closed and the auxiliary gates 22 open to allow of a normal flow of water through the passages 21, the size of which may be regulated by adjusting said auxiliary gates through the operating mechanisms thereof previously described. When, however, the volume of water passing through the watercourse is abnormal and there is danger of a flood, relief may be afforded by throwing open the main gates 3 and 4, as will be understood, this operation being effected by turning the shaft or rod 17 to rotate the pinions 16, and thereby transfer motion to the rack-bars 12 to swing said main gates open. The operation of these parts in the reverse direction will swing the gates closed, as will be readily understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a water or flood gate, the combination of side walls or abutments, main gates hinged or pivoted thereto, each of said main gates being provided with a water-passage, auxiliary gates for controlling said water-passages, means for operating said auxiliary gates, segmental rack-bars fixed at one end to the main gates and movable in guides in the abutments, operating-shafts on the abutments provided with pinions to engage said rack-bars, and swinging brace-rods connected at their outer ends to the rack-bars and pivotally connected at their inner ends to the said main gates, substantially as described.

2. In a water or flood gate, the combination of side walls or abutments, main gates hinged or pivoted thereto, each main gate having a water-passage, means for operating the main gates, a sliding gate or door controlling the water-passage of each main gate, a drum or windlass on the main gate, having an actuating crank-handle, a connection between the windlass and auxiliary gate, and a swinging bail on the platform to engage the crank-handle and hold it from movement, substantially as described.

In testimony whereof I have hereunto set my hand in presence of two subscribing witnesses.

JACOB HANSEN.

Witnesses:
 EDGAR BAKER,
 JOSEPH M. GARDNER.